INVENTOR
Eugene R. Lucka,
BY
Diggins + LeBlanc,
ATTORNEYS

Oct. 12, 1965 E. R. LUCKA 3,211,009
BALANCING MACHINE
Filed Jan. 18, 1961 3 Sheets-Sheet 3
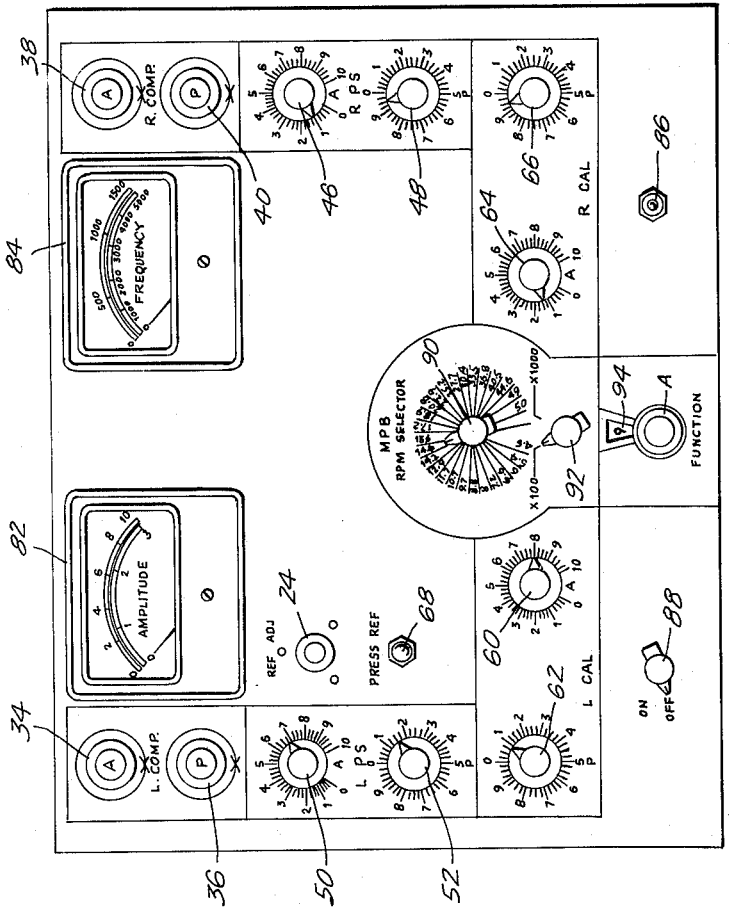
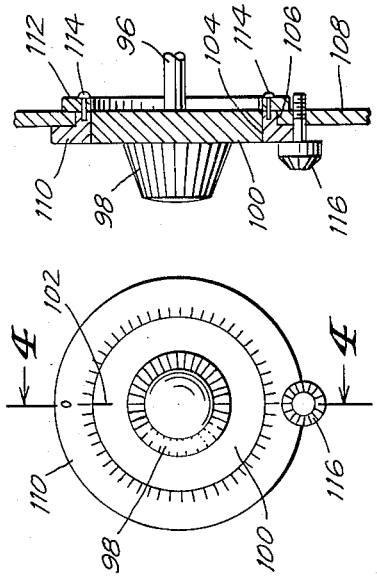
INVENTOR
Eugene R. Lucka,
BY Diggins + LeBlanc
ATTORNEYS

United States Patent Office 3,211,009
Patented Oct. 12, 1965

3,211,009
BALANCING MACHINE
Eugene R. Lucka, Columbus, Ohio, assignor to International Research and Development Corporation, Worthington, Ohio, a corporation of Ohio
Filed Jan. 18, 1961, Ser. No. 83,445
15 Claims. (Cl. 73—462)

This invention relates to dynamic balancing of rotating bodies and more particularly relates to an improved apparatus and method for accomplishing such balancing.

In two plane balancing of rotating bodies it is necessary to make some provision for the elimination of cross-effect and to provide some method of accurately calibrating the analyzing instrument. With respect to the former problem two basic solutions have been proposed and utilized to greater or lesser extents. In older equipment it is customary to eliminate the unbalance component in one plane through the use of a specially designed flexibly restrained carriage pivoted about an axis or point contained in one of the two correction planes. This system is useful in many situations but impractical for high speed balancing of large rotors. It also necessitates removing the rotor from its normal mounting and environment. A more widely used system for elimination of cross-effect relies upon an electrical compensating means whereby the vibration in the two planes is transduced into electrical signals and the component due to cross-effect is electrically balanced out. When such a system is properly adjusted it indicates separately the mass correction needed in each of the two planes.

While the latter type system does not require a special carriage and permits balancing at the operating speed of the particular rotor, the system must first be calibrated or compensated to establish cross-effect free operating conditions. Since calibration or compensation data of this type is difficult to determine by computation, as a practical matter such systems are almost always adjusted empirically, either by operating the system with a perfectly balanced rotor to which artificial unbalance masses of known magnitude are added, or by using an unbalanced rotor for calibration and first adjusting the analyzing system in such a manner as to electrically simulate a perfectly balanced rotor before the above-mentioned known artificial unbalance masses are added.

Both calibrating methods leave much to be desired. The requirements for a perfectly balanced rotor are exacting and expensive to achieve where high speed operation is necessary. The balance-simulating method, on the other hand, requires rather complicated and space-demanding auxiliaries, such as signal generators for producing the balance-simulating signals. Since such signal generators must operate in synchronism with the unbalance signal it is customary to mechanically drive them from the rotor under test thereby necessitating a physical connection which is sometimes difficult to make. In addition to this, a large number of test runs of the unbalanced rotor are generally necessary so that the method becomes increasingly time-consuming as either the size or speed of the rotor is increased.

According to the present invention, it has now been found that it is possible to achieve balancing in an unpivoted carriage at normal rotor speed through electrical elimination of cross-effect with a marked reduction in both the amount of equipment necessary and the number of runs and amount of time necessary to complete the operation. The invention is characterized by both the simplified equipment and also the particular method in which that equipment is utilized to secure a quicker balance with a considerably reduced possibility of error. The apparatus and method are uniquely arranged so that it is unnecessary to observe quantitative meter readings and is unnecessary to make any recordings except of the final amounts and positions of unbalance in the two balance planes. Not only is the method and equipment suited to use by a completely untrained operator, but the method and apparatus also is capable of greatly reducing the likelihood of error which any type operator might make where quantitative observations and recordings are necessary. No physical connection of the apparatus to the rotor is necessary and, according to one embodiment of the invention, it is only necessary that the rotor be observable through a single aperture in the rotor casing.

In a specific embodiment of the present invention, the balancing unit is provided with a reference operator which is energized by one of the two pickups associated with the rotor under analysis and this reference operator operates upon the signal which it receives to produce a reference signal of fixed amplitude and wave form but adjustable phase. The apparatus also includes a pair of compensator operators capable of adjusting both phase and amplitude and the output of the reference operator is connectable to the compensator operators so that the compensator operators may be adjusted to provide signals which may be utilized to simulate a balanced rotor. Once this has been accomplished, it is then possible to effect electrical plane separation and to also effect calibration of the unit in both phase and amplitude.

In another embodiment of the invention suitable means is provided to permit balancing of a rotor through the use of a stroboscopic light even though it is possible to view the rotor only through a small aperture in its casing.

One of the important features of the invention is the use of a reference operator for producing a voltage capable of use to simulate a balanced rotor wherein the reference operator produces an output voltage of known and fixed amplitude and wave shape which is adjustable in phase relative to the rotation of the piece under test. This signal can then be further modified to produce two additional signals which are equal in amplitude and opposite in phase to the output signals from a pair of pickups associated with the work piece so as to simulate perfect balance.

It is accordingly a primary object of the present invention to provide an improved dynamic balancing apparatus.

It is another object of the invention to provide an improved dynamic balancing apparatus which is capable of use by relatively untrained operators and which minimizes the possibility of operator error.

It is another object of the invention to provide dynamic balancing apparatus which is relatively simple in construction and particularly in operation whereby the only data which need be recorded from the apparatus is the final amplitude and phase of the unbalance mass.

It is another object of the invention to provide an improved dynamic balancing apparatus wherein balancing is accomplished through a series of steps wherein the controls of the apparatus need only be adjusted in order to null a meter.

It is a still further object of the invention to provide an improved method of electrically simulating a rotor balanced in two spaced planes through the use of electrical signals produced by pickups associated with the rotor proximate such planes by modifying the signal from one of such pickups to produce a reference signal of known wave shape, phase and amplitude, which reference signal may then be modified to produce a pair of signals equal in amplitude and opposite in phase to the output signals from the two pickups.

It is still a further object of the invention to provide an improved dynamic balancing apparatus which permits the determination of the position and amount of unbalance in a rotor operating in its own frame or casing through the use of a stroboscopic light even where it is possible to observe only a very limited portion of the rotor under the illumination of such light.

These and further objects and advantages of the invention will become more apparent from reference to the following specification and claims and the appended drawings wherein:

FIGURE 3 is a front elevation of the calibration operator dial constructed according to another embodiment of the invention;

FIGURE 4 is a vertical section of the dial of FIGURE 3 taken along the line 4—4 of FIGURE 3; and FIGURE 5 is a front elevation of a balancing apparatus constructed according to the present invention and containing as an integral part thereof the balance analyzer.

Figure 1:
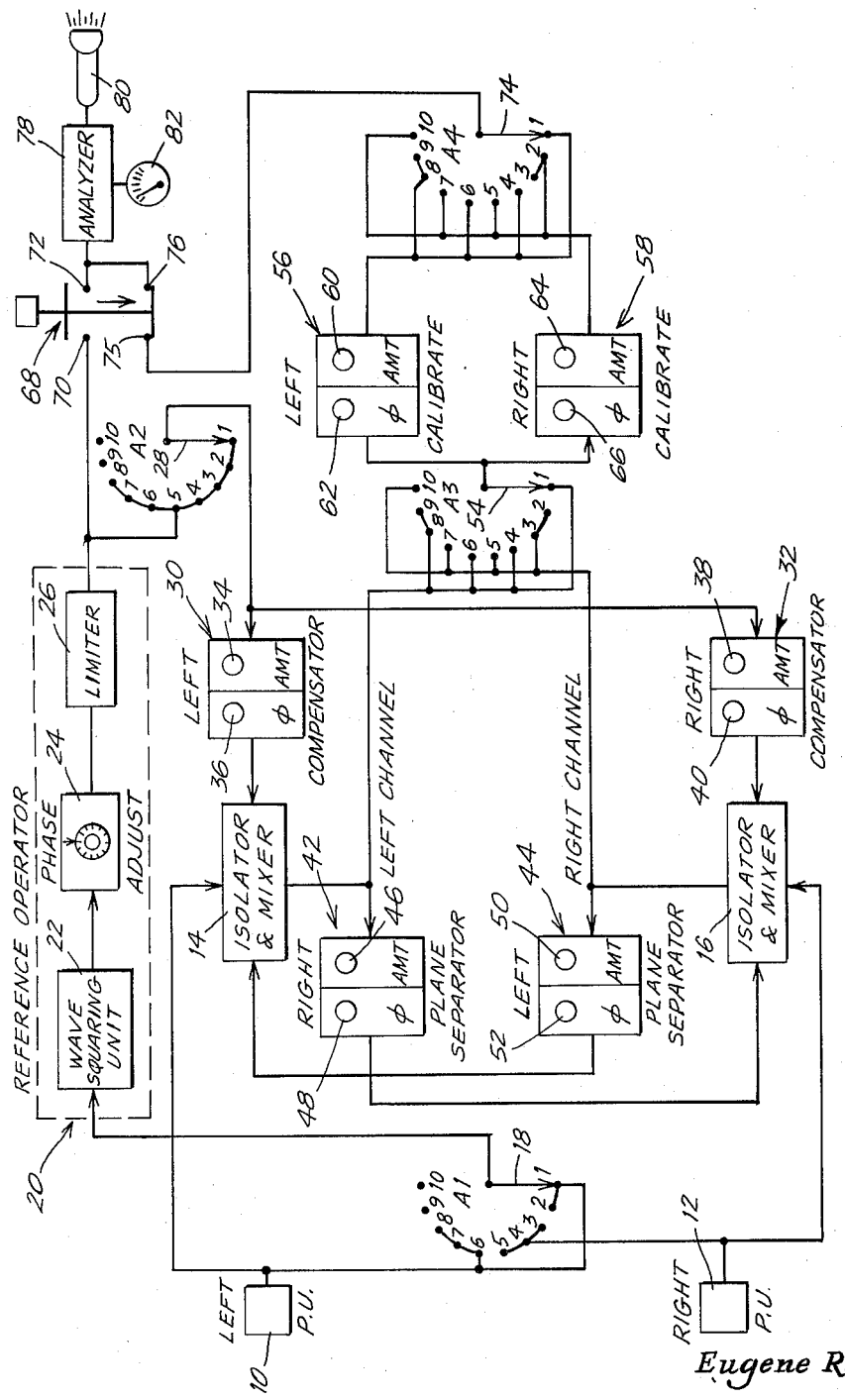
FIGURE 1 is a simplified diagrammatic view of a balancing apparatus constructed according to the present invention.

Referring more particularly to FIGURE 1, there are provided a pair of pickups 10 and 12 which are adapted to be associated with the left and right ends of a rotor at the positions of the spaced planes where it is desired to create dynamic balance. The left pickup 10 is connected to contacts 1, 2, 6, 7 and 8 of deck A–1 of a four deck ten position rotary selector switch A while the right pickup 12 is connected to contacts 3, 4 and 5. The left pickup 10 is also connected to an isolator and mixer 14 in the left channel of the unit while the right pickup 12 is connected to a similar isolator and mixer 16 in the right channel of the unit.

The movable arm 18 of deck A–1 of the selector switch A is connected to a reference operator generally indicated at 20. This reference operator consists of a wave squaring unit 22 which operates upon the signal fed thereto to transform it into a square wave. The output of the wave squaring unit 22 is in turn fed to a phase adjusting operator 24 and from there to a limiter 26 which insures a constant amplitude output from the reference operator 20. The output of the reference operator is fed to contacts 1–8 of deck A–2 of the selector switch A. The movable arm 28 of deck A–2 is connected to the inputs of left and right compensator operator units 30 and 32 which are provided with controls 34, 36, 38 and 40 for adjusting both the amplitude and phase of signals fed thereto. It is a feature of the invention that these controls need not be quantitatively calibrated but may consist simply of unmarked knobs. The outputs of the left and right compensator operators 30 and 32 are fed to the left and right isolators and mixers 14 and 16 respectively.

These isolators and mixers are also connected to right and left plane separator operators 42 and 44 which are also provided with amplitude and phase controls 46, 48, 50 and 52. Again it is a feature of the invention that these controls need not be calibrated. The outputs of the right and left plane separators 42 and 44 are respectively connected to the left and right isolators and mixers 14 and 16.

The isolators and mixers 14 and 16 are further connected to deck A–3 of the selector switch A, the left isolator and mixer 14 being connected to contacts 1, 4, 6, 8 and 9 and the right isolator and mixer 16 being connected to contacts 2, 3, 5, 7 and 10. The movable arm 54 of deck A–3 is connected to a pair of calibration operators 56 and 58. These operators are provided with amplitude and phase controls 60, 62, 64 and 66 which need no calibration. The outputs of the calibration operators 56 and 58 are connected to the deck A–4 of the selector switch A, the left calibration operator 56 being connected to contacts 1, 4, 6, 8 and 9 and the right calibration operator 58 being connected to contacts 2, 3, 5, 7 and 10.

A push button type switch 68 of the double pole single throw variety has a first pair of contacts 70 and 72 and a second pair of contacts 75 and 76. The first pair of contacts 70–72 is normally open while the second pair of contacts is normally closed. Contact 75 is connected to the movable arm 74 of the deck A–4 of the selector switch A. The push button switch contacts 72 and 76 are both connected to a conventional vibration analyzer 78 which actuates a stroboscopic light 80 and a vibration amplitude indicating meter 82. A suitable analyzer for this purpose is described in detail in Ongaro Patent No. 2,711,647. The contact 70 on the push button switch 68 is connected to the output of the reference operator 20.

The isolators and mixers 14 and 16 are of such a nature that the signals fed thereto by the compensator and plane separator operators do not react upon the outputs from the left and right pickups 10 and 12 which are fed to the reference operator 20 as shall be described in further detail.

The operation of the balancing apparatus of FIGURE 1 will now be described. The pickups 10 and 12 are mounted in engagement with the casing or bearings of the apparatus containing the rotor to be balanced substantially at the positions where the balancing is to be effected and a reference mark is applied to the rotor at a position observable under the illumination of the stroboscopic light 80. The rotor is now started and operated under the motive power of the machine of which it forms a part.

The balancing operation is carried out as the rotary switch A is rotated through its ten positions starting with position 1. As the rotor rotates both pickups 10 and 12 produce vibration signals and the signal from the left pickup 10 is fed through the first contact of deck A–1 of the rotary switch through movable arm 18 to the reference operator 20. The push button switch 68 is now depressed thereby connecting the output of the reference operator 20 to the analyzer 78 to actuate the stroboscopic light 80. The amplitude meter 82 will also provide a reading but this is of no significance since the reference operator provides an output signal of constant amplitude. The phase adjuster 24 in the reference operator is now adjusted so that the reference mark on the rotor appears as a convenient position under the illumination of the stroboscopic lamp. As an example, high noon may be utilized as an easily remembered and easily reproducible position. The push button switch 68 is now released thereby disconnecting the reference operator 20 from the analyzer 78. The left pickup 10, however, now feeds a signal through the left isolator and mixer 14, contact 1 of deck A–3, movable arm 54, left calibration operator unit 56, contact 1 of deck A–4, movable arm 74 and contacts 75 and 76 of push button switch 68 to the analyzer 78 to actuate the amplitude meter 82 and the stroboscopic light 80. The reference operator 20 simultaneously feeds a signal to the left isolator and mixer 14 through contact 1 of deck A–2 of the selector switch, movable arm 28 and left compensator operator 30. Thus, the signal actuating the analyzer 78 is a composite of the signal from the reference operator 20 and the signal from the left pickup 10.

The left calibration operator 56 through which the mixed signal passes is set with its amplitude control 60 at maximum gain and its phase control 62 at zero phase shift. It will be recognized that no quantitative scale markings need be provided to set up this condition since it is created by adjustments of the controls to their internal limits. The left compensator operator 30 is now adjusted in phase and amplitude to get a null on the amplitude meter 82. When this occurs the output of the left compensator operator 30 constitutes a signal equal in amplitude and opposite in phase to that produced by the left pickup 10 so that from an electrical standpoint the analyzer 78 sees a condition of balance at the position of the left pickup.

The selector switch A is now turned to position 2. The right pickup 12 now feeds a signal through the right isolator and mixer 16 to contact 2 of deck A–3 and thence through movable arm 54, right calibration operator 58, contact 2 of deck A–4, movable arm 74 and contacts 75 and 76 of push button switch 68 to analyzer 78 to operate the amplitude meter 82 and stroboscopic light 80. The right isolator and mixer 16 at the same time receives a signal from the reference operator 20 through contact 2 of deck A–2, movable arm 28 and right compensator operator 32. The right calibration operator 58 has its amplitude control 64 set to maximum gain and its phase control 66 set to zero phase shift. The right compensator operator 32 is now adjusted both in phase and amplitude to null the amplitude meter 82 in the analyzer 78 whereupon, from an electrical standpoint, the right pickup 12 sees a balanced condition. The rotor is now stopped and it will be clear that, electrically speaking, a balanced rotor is simulated by the settings which exist in the controls of the left and right compensator operators 30 and 32. These settings need not be quantitatively noted but simply allowed to remain as they are.

The switch A is now rotated to position 3. A known weight is attached to the rotor in the angular position of the reference mark in a plane selected as one rotor balance plane, for example at the right plane adjacent right pickup 12, and the rotor is started. The push button 68 is depressed whereupon the stroboscopic light 80 is energized by the reference operator 20 in the following manner. The right pickup 12 feeds an input to the reference operator 20 through contact 3 of deck A–1 and movable arm 18. The reference operator feeds an output to the analyzer 78 and stroboscopic light 80 through contacts 70 and 72 of the push button switch 68. As previously stated, the reading of the amplitude meter 82 is of no significance at this time since the output of the reference operator 20 is always of the same amplitude. The phase adjuster 24 in the reference operator 20 is now adjusted to bring the rotor reference mark back to the previously established high noon position under the illumination of the stroboscopic light 80.

It will be noted that at this time the reference operator 20 is being actuated by the right pickup 12 in contrast to its prior actuation by the left pickup 10 when the selector switch was in positions 1 and 2. This makes no difference, however, since the reference operator always produces an output of fixed amplitude and its phase has been adjusted to again coincide with that which was initially established.

The selector switch A is now turned to position 4. At this time the reference operator 20 is energized by the right pickup 12 through contact 4 of deck A–1 and movable arm 18 and feeds its signal of known amplitude and phase through contact 4 of deck A–2 and movable arm 28 to the left and right compensator operators 30 and 32. The analyzer 78 is connected to the left channel from left isolator and mixer 14 though contact 4 in deck A–3, movable arm 54, left calibration operator 56, contact 4 in deck A–4, movable arm 74 and push button contacts 75 and 76. Since both the left and right compensator operators 30 and 32 have been previously adjusted to simulate an electrically balanced rotor under the energization of the signal from the reference operator 20, the output signal received by the analyzer 78 from the left channel constitutes a cross effect signal produced by the addition of the known weight to the right plane adjacent the right pickup 12.

The left plane separator operator 44 is at this time receiving from the right pickup 12 through the right isolator and mixer 16 a signal which is produced by the known weight in the right plane. The output of the left plane separator operator 44 is in turn fed to the left isolator and mixer 14 where it is mixed with the cross effect signal from the left pickup 10. The left plane separator operator 44 is now adjusted both in amplitude and phase to null the amplitude reading in the meter 82 to thereby cancel the cross effect in the left plane produced by the weight in the right plane. The left plane separator operator 44 is now set up and need not be readjusted nor need any quantitative readings of its control knobs be noted or recorded.

The selector switch A is now turned to position 5. The reference operator 20 continues to be activated by the right pickup 12 and continues to feed a signal to both the left and right compensator operators 30 and 32 so that a balanced rotor is simulated except for the signal produced by the known weight in the right plane. At this time the analyzer 78 is energized by the signal produced by the known weight in the right plane from right isolator and mixer 16, switch contact 5 of deck A–3, movable arm 54, right calibration operator 58, switch contact 5 in deck A–4, movable arm 74 and contacts 75 and 76. Since an electrically balanced rotor has been simulated, the signal activating the analyzer 78 is produced solely by the known weight introduced in the right channel. The phase control 66 in the right calibration operator 58 is now adjusted to return the reference mark on the rotor to high noon under the illumination of the stroboscopic light 80 and the amplitude control 64 in the right calibration operator is adjusted to get a direct or convenient reading on the amplitude meter 82 in terms of the known weight introduced into the right plane of the rotor. That is to say, if the known weight was a ten ounce weight, the amplitude control 64 may be adjusted until the meter 82 reads 10 whereupon the meter will be direct reading. The adjustment of the calibration operator phase control has produced a zero lag or lead angle so that the phase indication is also direct reading. The rotor is now stopped.

The selector switch A is turned to position 6. The known weight is removed from the right plane adjacent the right pickup 12 and is placed on the rotor at the left plane adjacent the left pickup 10. Preferably the weight is added at the angular location of the rotor reference mark. The rotor is now started and the push button 68 depressed. The reference operator 20 is now energized from the left pickup 10 through contact 6 of deck A–1 and movable arm 18 and feeds a signal direct to the analyzer 78 through the push button contacts 70 and 72. As in previous cases, the amplitude of the signal from the reference operator is fixed and its phase is adjusted by an adjustment of the phase adjuster 24 until the reference mark on the rotor is returned to the high noon position under the illumination of the stroboscopic lamp 80. This adjustment provides the reference voltage to be fed to the compensator operators 30 and 32 in order to simulate a balanced rotor.

The selector switch is now turned to position 7. The reference operator is still energized by the left pickup through contact 7 in deck A–1 and movable arm 18 and feeds an input to the left and right compensator operators 30 and 32 through contact 7 in deck A–2 and movable arm 28. The outputs from the compensator operators 30 and 32 are fed into the respective isolators and mixers 14 and 16 where they are mixed with the signals from the left and right pickups 10 and 12 to produce resultant signals which would be zero except for the addition of the known weight in the left plane. The analyzer 78 is at this time energized by the right pickup 12 in the following manner: through right isolator and mixer 16, contact 7 in deck A–3, movable arm 54, right calibration operator 58, contact 7 in deck A-4, movable arm 74, and push button contacts 75 and 76. Since a balanced rotor is simulated electrically and since the known weight is in the left plane, the signal which is reaching the analyzer at this time is a cross effect signal due to the weight in the left plane.

The right plane separator operator 42 is at this time energized by the signal from the left pickup 10 through the left isolator and mixer 14, this signal being the signal due to the addition of the known weight in the left plane. The output of the right plane separator operator 42 is fed to the right isolator and mixer 16. The phase and amplitude controls 48 and 46 of the right plane separator operator 42 are now adjusted to produce a null in the reading of the amplitude meter 82 in the analyzer 78. The right plane separator operator is now set up to eliminate the effect in the right plane of the weight added in the left plane.

The selector switch A is now turned to position 8. The analyzer 78 is at this time energized by the left pickup 10 through the left isolator and mixer 14, contact 8 in deck A-3, movable arm 54, left calibration operator 56, contact 8 in deck A-4, movable arm 74 and push button contacts 75 and 76. The phase control 62 in the left calibration operator 56 is adjusted to bring the reference mark to the high noon position under the illumination of stroboscopic light 80 and the amplitude control 60 is adjusted to provide on the amplitude meter 82 a direct or convenient reading of the known weight added in the left plane.

At this point the right and left plane separator operators 42 and 44 have been adjusted to electrically eliminate cross effect and the left and right calibration operators 56 and 58 have been adjusted to render the reading of the amplitude meter 82 in the analyzer 78 direct or at least calibrated. The adjustment of the phase controls in the calibration operators has also rendered the reading of the stroboscopic light 80 direct in terms of the position of the unbalance mass. That is to say, the lag or lead angle has been reduced to zero so that if the rotor is positioned to place the reference marker in the spot observed under the illumination of the stroboscopic lamp the unbalance mass will be found at the high noon position.

The selector switch A is now turned to position 9. At this time the reference operator 20 is completely switched out of the circuit.

The left pickup and left channel is now actuating the analyzer 78 through left isolator and mixer 14, contact 9 of deck A-3, movable arm 54, left calibration operator 56, contact 9 of deck A-4, movable arm 74 and push button contacts 75 and 76. Cross effect correction is being fed into the left isolator and mixer 14 from the left plane separator 44 so that the signal fed to the analyzer and actuating the amplitude meter 82 and stroboscopic light 80 produces a true reading of the unbalance mass in both amplitude and phase. It must be remembered, however, that the known weight still remains on the rotor at the left plane. Balance can be carried out with this known weight in position if it is desired to leave it on the rotor after balancing is completed. However, in most cases it is desirable to stop the rotor, remove the weight, and restart the rotor prior to reading the unbalance in the left plane. A record is now made of this amount and phase of unbalance. It is to be noted that this has been the first data recorded from the apparatus.

The selector switch is now turned to position 10. The reference operator 20 remains disconnected from the circuit. The analyzer 78 is energized by the right channel and right pickup through right isolator and mixer 16, contact 10 in deck A-3, movable arm 54, right calibration operator 58, contact 10 in deck A-4, movable arm 74 and contacts 75 and 76. Cross effect correction is fed to the right isolator and mixer 16 from the right plane separator 42. The amount and phase position of unbalance in the right plane may now be directly read on the amplitude meter 82 and stroboscopic light 80 and these readings recorded.

This completes the use of the apparatus in the balancing operation. The rotor is stopped and rotated to place the reference mark at the noted position in switch position 9 and the noted amount of unbalance mass is removed at the left plane at the high noon position. This same procedure is then repeated in the right plane utilizing the information obtained at switch position 10 and the entire balancing procedure is completed. It will be obvious that instead of weight removal it would be possible to accomplish balancing by weight addition at positions 180° removed from the high noon position.

While the description of the balancing procedure may make the operation appear somewhat lengthy, this is only because the description of the mode of operation included a complete explanation of the connections of the active components at each switch position and the purpose of those connections. In practical usage, the procedure is quite simple and can be reduced to a series of instructions keyed to the ten switch positions.

Referring to FIGURE 5 there is shown a balancing apparatus of the type described combined with a vibration analyzer. The analyzer is provided with an amplitude meter 82, a frequency meter 84, an output jack 86 for connection to a suitable stroboscopic lamp and an on-off switch 88. The components of the balancing apparatus of FIGURE 1 are identified by the same reference numerals. In addition to the components described in FIGURE 1 a filter is contained in the unit and is tuned by the r.p.m. selector switch 90 and its multiplier switch 92. The selector switch A actuates a suitable dial behind a window 94 whereby the position of the switch is always readily determined. An illustrative simplified procedure will now be given referring to the indicia found on the face of the instrument shown in FIGURE 5.

(1) Apply reference mark to rotor and start rotor. Set R CAL control A to maximum and P to zero. Depress PRESS REF and adjust REF ADJ for high noon position of reference marker. Release PRESS REF, set L CAL control A to maximum and P to zero. Adjust L COMP controls A and P for null of amplitude meter.

(2) Adjust R COMP controls A and P for null. Stop rotor.

(3) Add weight of ———— oz. in right plane at reference mark and start motor. Depress PRESS REF and adjust REF ADJ for high noon.

(4) Adjust LPS controls A and P for null.

(5) Adjust R CAL control P for noon and control A for reading of amplitude meter equal to weight of step 3 or other convenient reading. Stop rotor.

(6) Move weight from right plane to left plane and start rotor. Depress PRESS REF and adjust REF ADJ for noon.

(7) Adjust RPS controls A and P for null.

(8) Adjust R CAL control P for noon and A for reading of weight of step 3 or other convenient reading on amplitude meter.

(9) Stop rotor, remove weight and start rotor. Left Phase ————, Left Amplitude ————.

(10) Right Phase ————, Right Amplitude ————.

The foregoing balancing procedure entails observation of the position of the reference marker throughout 360° in order to locate the position of unbalance. With some machinery this would be difficult or impossible if the rotor is to be balanced in position in the casing with the machine operating under its own power. In most instances, however, there is at least a small access opening through which it is possible to observe at least a portion of the rotor as it rotates. It is a feature of this invention that by a mechanical modification of the equipment shown in FIGURES 1 and 5 it is possible to carry out a balancing procedure where the only observation of the rotor in rotation is through a very limited access opening.

The casing of the machine must, of course, be opened after the balance information is obtained in order to permit the removal or addition of weight to the rotor, but this usually presents no problem. That is to say, the difficulty arises because of the necessity of retaining the casing in position during rotation whereas the casing can be removed once the machine is stationary.

Referring to FIGURES 3 and 4 there is shown a modification of the dials associated with the phase controls in the calibration channels. The phase control shaft 96 has attached thereto a knob 98 that carries a skirt 100 having a reference mark 102 thereon. The skirt 100 is journaled within a cylindrical member 104 mounted in an aperture 106 in the front panel 108 of the unit. The front of the cyindrical member 104 constitutes an annular dial plate 110 calibrated from zero to 360°. The rear edge of the cylindrical member 104 has a ring 112 attached thereto by screws 114 in order to hold the cylindrical member 104 in position in the panel 108. A lock screw 116 is provided at the bottom of the dial 110 to lock that dial in position when desired.

The operation of the apparatus utilizing this type of dial is substantially similar to that described above with the following exceptions. The reference mark is applied to the rotor through the small access opening so that it is observable at least when it is in its initial position. Thereafter the stroboscopic light is directed at this access opening and all phase adjustments of the reference operator are made to bring the reference mark back to this position rather than a high noon position. In switch positions 5 and 8 the lock screws 116 are loosened and the outer dial plates 110 rotated so that the zero mark thereon is in line with the reference mark 102 after the phase calibration has been accomplished. In steps 9 and 10, instead of reading the phase position of unbalance under the stroboscopic light, the calibration phase controls are rotated to bring the reference mark back into position where it is observable under the stroboscopic light at the access aperture. The position of the unbalance mass on the rotor is then read directly from the outer dial plates 110 associated with the respective phase controls in the calibration operators. The cover of the machine being balanced may then be removed after the rotor is stopped and the angular distance measured from the reference mark and a suitable correction applied.

In describing the apparatus of this invention in terms of the diagram shown in FIGURE 1 certain simplifications have been made in order to avoid unduly complicating the description of the operation of the unit.

Figure 2:
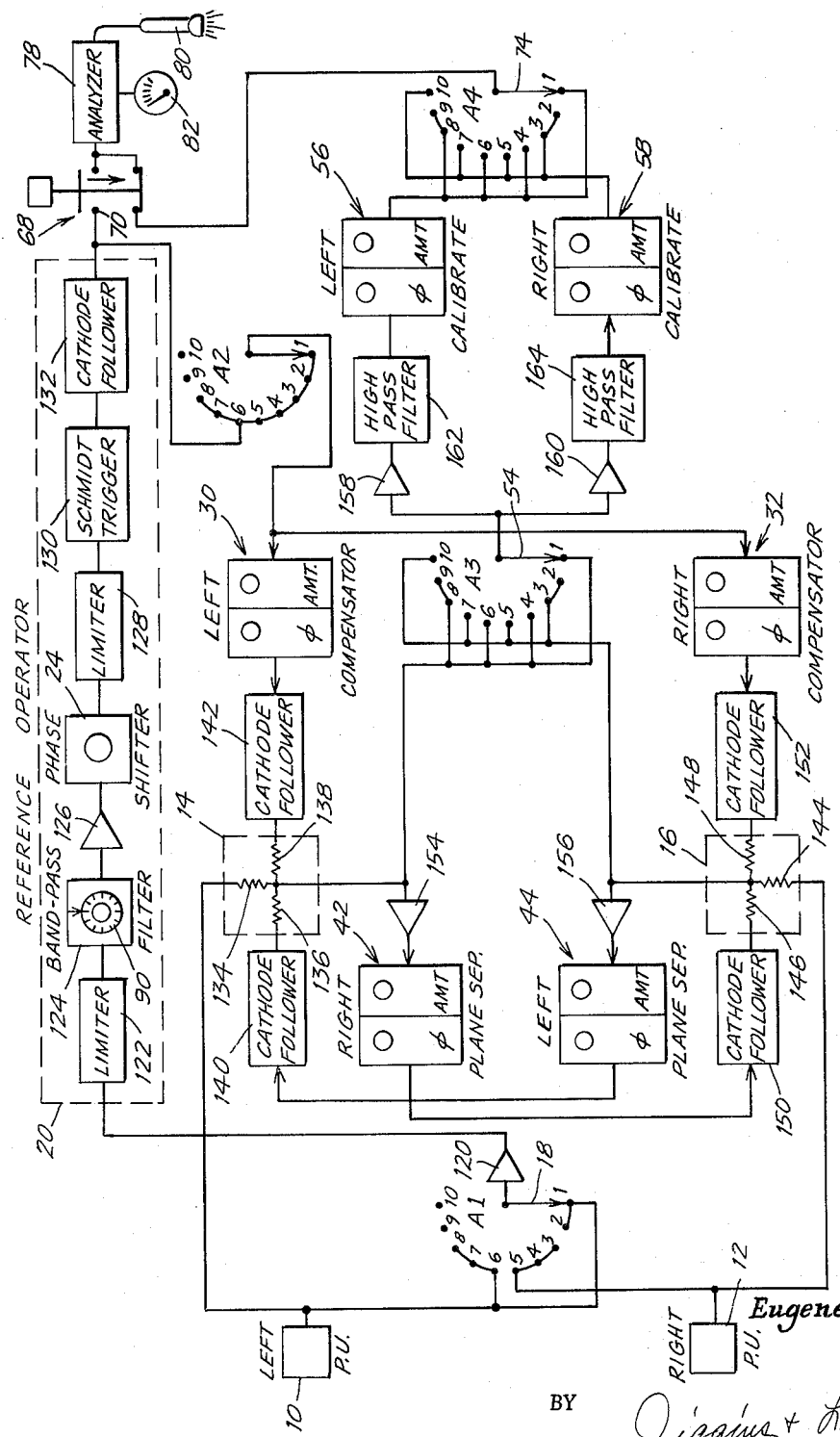
FIGURE 2 is a complete block diagram of a balancing apparatus constructed according to the present invention.

Referring now to FIGURE 2 there is shown in block diagram a more detailed depiction of the apparatus of FIGURE 1. Similar reference numerals have been used where appropriate to indicate identical components. Referring to FIGURE 2 it will be seen that the movable arm 18 of deck A-1 of the selector switch is connected to the reference operator 20 through an amplifier 120. The reference operator consists of an input limiter 122 which removes unwanted harmonics and noise from the signal and a tunable band pass filter 124 which further purifies the signal and which has a control knob 90 which is indicated in the embodiment of the invention shown in FIGURE 5. The output of the band pass filter 124 is fed through an amplifier 126 to a 360° phase shifter 24. Since the signal has been through the limiter and filter prior to reaching the phase shifter, the phase shifter operates on substantially a sinusoidal voltage thereby permitting easy and economical phase control. The output of phase shifter is fed through a further limiter 128 which feeds a squaring circuit consisting of a Schmidt trigger 130. As is known to those skilled in the art, a Schmidt trigger operated in this fashion produces a square wave independently of the shape of the input voltage wave form with the output amplitude of the square wave being independent of input amplitude. The output from the Schmidt trigger 130 is fed to a cathode follower 132 and thence to the contact 70 of push button switch 68. This output is also connected to contacts 1-8 of deck A-2 of the selector switch as in the embodiment of the invention in FIGURE 1.

The purpose of the reference operator is to produce a reference signal which may be used to compensate an unbalanced rotor and it is therefore important that the unit be capable of supplying a constant amplitude signal of accurately known wave form. In the embodiment of the invention shown in FIGURE 2 this is accomplished through the use of an output signal which constitutes a square wave regardless of the wave shape of the input signal which is received from whichever pickup is energizing the reference operator. The use of limiting and band pass filtering prior to feeding the signal to the Schmidt trigger assures uniformity in the output of the trigger circuit. That is to say, while the amplitude of the square wave produced by the Schmidt trigger is independent of the amplitude of the input signal the duration of the positive and negative half waves is dependent upon the interval between the time when the input voltage exceeds a predetermined positive voltage and drops below a predetermined negative voltage.

The outputs from the left and right pickups 10 and 12 are respectively fed to the isolating and mixing networks 14 and 16. The purpose of these networks is to prevent voltages fed thereinto from affecting the voltages at the terminals of the pickups since this would upset the reference voltage produced by the reference operator. The left isolator and mixer 14 consists of a series of commonly connected resistors 134, 136 and 138. The resistor 134 is connected to the left pickup, the resistor 136 is connected to a cathode follower 140 which receives the output from the left plane separator operator 44, and the resistor 138 is connected to a cathode follower 142 which receives the output of the left compensator operator 30. Similarly, the right isolator and mixer 16 consists of a series of commonly connected resistors 144, 146 and 148. The resistor 144 is connected to the right pickup 12, the resistor 146 is connected to a cathode follower 150 which receives the output of the right plane separator operator 42, and the resistor 148 is connected to a cathode follower 152 which receives the output of the right compensator operator 32.

The desired isolating action can be secured if the values of the three resistors in each isolator-mixer are approximately equal and are at least 50 times the value of the resistance of the pickups and the source or output impedance of the cathode followers. In one illustrative example, the three resistors 134, 136, 138 and resistors 144, 146 and 148 were each 0.47 megohms.

The outputs of the isolator-mixers 14 and 16 are taken from the junction points of the resistors and are fed to amplifiers 154 and 156 which respectively feed the right and left plane separator operators 42 and 44.

The movable arm 54 of deck A-3 of the selector switch A feeds the left and right calibration operators 56 and 58 through amplifiers 158 and 160 and high pass filters 162 and 164. The purpose of these filters is to eliminate tube noise at low frequencies when the speed selector switch 90 (FIGURE 5) is set for high speeds. It will be understood that this speed selector switch controls the band pass filter 124 in the reference operator 20.

It will be obvious to those skilled in the art that the cathode followers found in this embodiment of the invention are utilized as impedance matching and isolating devices and that other impedance matching and isolating devices may be utilized without departing from the invention. Similarly, the amplifiers found in the apparatus of FIGURE 2 are intended to provide the necessary signal level but may be replaced with amplifiers in other portions of the circuit. The operation of this embodiment of the invention is identical to that described in connection with the embodiment of FIGURES 1 and 5 and will not be repeated.

It will be apparent from the foregoing that the apparatus of this invention provides a device wherein rotating machinery may be balanced through information obtained while the machinery operates under its own power. The equipment is relatively simple in nature and its mode of operation is such as to minimize the possibility of operator error. The equipment obviates the necessity of a mechanical connection between the rotating machinery and the balance apparatus and also eliminates the need for a reference generator either for the determination of phase or for the purpose of simulating a balanced rotor. The equipment may be used in a novel method to electrically simulate a balanced rotor associated with two pickups by modifying the signal from one of the pickups to produce a reference signal of known phase, amplitude and wave shape and then simultaneously modifying the reference signal to produce two signals equal and opposite in amplitude and phase to the output signals from the pickups. Where desired the balancing apparatus may be combined with a vibration analyzer capable of indicating phase and amplitude of vibration. In one embodiment of the invention a means is provided which permits the balancing of a rotor where it is possible to view the rotating rotor only through a small aperture in its casing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. In a balancing apparatus adapted to be connected to a pair of pickups for two plane balancing of a rotating rotor, a reference operator connectable to at least one of said pickups to be energized thereby to produce a reference signal of fixed amplitude and adjustable phase, a pair of compensator operators capable of adjusting the phase and amplitude of a signal fed thereto, said reference operator being connectable to each of said compensator operators, a pair of mixers for mixing the outputs of said pickups and the outputs of said compensator operators, means for connecting the output of said reference operator to said compensator operators, and means for connecting one of said pickups and the output of one of said compensator operators to one of said mixers and for connecting the other pickup and the other compensator operator to the other of said mixers to produce output signals from said mixers which simulate those which would be obtained from a balanced rotor.

2. In a balancing apparatus capable of indicating amount and position of unbalance of a rotating rotor in a pair of planes and adapted to be connected to a pair of pickups associated with said rotor proximate said planes, a reference operator connectable to at least one of said pickups to be energized thereby to produce a reference signal of fixed amplitude and adjustable phase, means in said apparatus for indicating phase, means for connecting the output of said reference operator to the means in said apparatus for indicating phase to establish a reference phase, a pair of compensator operators capable of adjusting the phase and amplitude of a signal fed thereto, a pair of mixers for mixing the outputs of said pickups and the outputs of said compensator operators, means for connecting the output of said reference operator to said compensator operators, and means for connecting said pickups and the output of said compensator operators to said mixers to produce output signals from said mixers which simulate those which would be obtained from a balanced rotor.

3. An apparatus as set out in claim 1 wherein said reference operator includes signal limiting means and band-pass filtering means.

4. In a balancing apparatus adapted to be connected to a pair of pickups for two-plane balancing of a rotating rotor subject to mechanical vibration, first and second mixers, means for coupling the outputs from said pickups to said mixers, a pair of plane separating electrical operators, one of said plane separating operators having its input coupled to said first mixer and its output coupled to said second mixer, the other of said plane separating operators having its input coupled to said second mixer and its output coupled to said first mixer for eliminating electrical cross-effect, means energized by one of said pickups for producing electrical reference signals, and means for coupling said reference signal means to said first and second mixers to simulate a balanced rotor.

5. An apparatus as set out in claim 4 wherein said means for producing electrical signals includes a reference operator capable of producing a signal of fixed amplitude and adjustable phase, and said means coupling said reference signal means to said first and second mixers includes a pair of compensator operators energizable by said signal.

6. An apparatus as set out in claim 5 wherein said reference operator includes limiting means and band-pass filtering means.

7. An apparatus as set out in claim 4 wherein said means for producing electrical signals includes a reference operator which on energization by one of said pickups produces a signal of predetermined amplitude and wave shape and adjustable phase.

8. An apparatus as set out in claim 7 wherein said reference operator includes means for rendering the signal received from said pickup substantially sinusoidal, phase shifting means receiving said sinusoidal signal, and means to square the output of said phase shifting means.

9. In a balancing apparatus adapted to be connected to a pair of pickups for two plane balancing of a rotating rotor, a reference operator connected to one of said pickups and producing a reference signal of predetermined amplitude and wave shape, a pair of compensator operators connected to the output of said reference operator and a pair of mixers connected to said pickups and said compensator operators, and adjustment means associated with said compensator operators to alter the phase and amplitude of the said reference signal to yield substantially zero mixer output to thereby electrically simulate a balanced rotor.

10. An apparatus as set out in claim 9 wherein said reference operator produces a square wave whose phase is adjustable relative to the rotation of said rotor.

11. An apparatus as set out in claim 9 wherein said reference operator includes means for rendering the signal received from said pickup substantially sinusoidal, phase shifting means receiving said sinusoidal signal, and means to square the output of said phase shifting means.

12. In a balancing apparatus adapted to be connected to a pair of pickups for two plane balancing of a rotating rotor, means for effecting electrical plane separation, a stroboscopic lamp for determining the positional location of the unbalance masses in the two planes, meter means for indicating the amount of the unbalance masses, and a pair of calibration operators connectable between said plane separation means and said stroboscopic lamp and amount indicating means, said calibration operators being capable of adjusting the amplitude and phase of signals fed thereto for calibrating the indications of said lamp and said amount indicating means, and scale means associated with each calibration operator to permit direct reading of the adjustment in phase.

13. An apparatus as set out in claim 12 wherein each said calibration operator includes a shaft adjustable to adjust phase, first indicia means fixed to said shaft for movement therewith, and second indicia means rotatably mounted relative to said shaft.

14. An apparatus as set out in claim 13 wherein said second indicia means comprises a circular scale mounted concentrically about said first indicia means.

15. An apparatus as set out in claim 14 including means for locking said second indicia means in position.

References Cited by the Examiner

UNITED STATES PATENTS

| | | | |
|---|---|---|---|
| 2,165,024 | 7/39 | Baker et al. | 73—466 |
| 2,805,576 | 9/57 | Rambo | 73—466 |
| 2,975,640 | 3/61 | Quell | 73—466 |
| 2,980,331 | 4/61 | Grubber et al. | 73—462 X |
| 3,039,312 | 6/62 | Krobath | 73—465 |
| 3,077,781 | 2/63 | Silver | 73—465 |
| 3,098,391 | 7/63 | Maus | 73—462 |

FOREIGN PATENTS 729,901  5/55  Great Britain.

RICHARD C. QUEISSER, *Primary Examiner.*

ROBERT L. EVANS, JOSEPH P. STRIZAK, *Examiners.*